(12) United States Patent
Son

(10) Patent No.: US 8,327,413 B2
(45) Date of Patent: Dec. 4, 2012

(54) DIGITAL CABLE BROADCAST PROCESSING APPARATUS AND METHOD THEREOF

(75) Inventor: Tae-yong Son, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1186 days.

(21) Appl. No.: 11/047,592

(22) Filed: Feb. 2, 2005

(65) Prior Publication Data

US 2005/0240977 A1    Oct. 27, 2005

(30) Foreign Application Priority Data

Apr. 26, 2004   (KR) .................................. 2004-28690

(51) Int. Cl.
*H04N 7/173*   (2006.01)
*H04N 7/16*    (2006.01)
*H04N 7/20*    (2006.01)
*H04N 7/18*    (2006.01)

(52) U.S. Cl. ............... 725/131; 725/6; 725/68; 725/85; 725/100; 725/139

(58) Field of Classification Search .................. 725/68, 725/85, 100, 131, 139, 6, 25, 31, 109–111, 725/151–153
See application file for complete search history.

(56) References Cited

U.S. PATENT DOCUMENTS

| | | | |
|---|---|---|---|
| 6,351,817 B1* | 2/2002 | Flyntz | 726/4 |
| 6,883,054 B2* | 4/2005 | Yamaguchi et al. | 710/302 |
| 7,095,437 B1* | 8/2006 | Hatakeyama | 348/231.7 |
| 7,298,846 B2* | 11/2007 | Bacon et al. | 380/212 |
| 2002/0152473 A1* | 10/2002 | Unger | 725/120 |
| 2004/0202096 A1* | 10/2004 | Nakajima et al. | 369/275.4 |
| 2004/0228175 A1* | 11/2004 | Candelore et al. | 365/158 |

FOREIGN PATENT DOCUMENTS

| | | | |
|---|---|---|---|
| JP | 11-355752 | | 12/1999 |
| JP | 2001-211402 | | 8/2001 |
| JP | 3427029 B | * | 8/2001 |
| JP | 2001-268534 | | 9/2001 |
| KR | 2002-0092745 | | 12/2002 |
| WO | 02/35830 | | 5/2002 |

* cited by examiner

*Primary Examiner* — Kristine Kincaid
*Assistant Examiner* — Gigi L Dubasky
(74) *Attorney, Agent, or Firm* — Stanzione & Kim, LLP

(57) ABSTRACT

A digital cable broadcast processing apparatus and a method thereof. A power supply supplies power, and an out-of-band (OOB) receiver receives additional OOB information from a transmission system. A cable card to descramble the received OOB information is mounted in an interface, and a controller controls the power supply in accordance with the presence and absence of the cable card, and accordingly controls the power supply to the OOB receiver. Whether or not the cable card is mounted is determined, and power is cut off or supplied in accordance with the result of the determination. As a result, unnecessary power consumption can be prevented when the cable card is not mounted.

22 Claims, 3 Drawing Sheets

DIGITAL CABLE BROADCAST PROCESSING APPARATUS AND METHOD THEREOF

CROSS-REFERENCE TO RELATED APPLICATIONS

This application claims the benefit of Korean Patent Application No. 2004-28690 filed Apr. 26, 2004, in the Korean Intellectual Property Office, the disclosure of which is incorporated herein in its entirety and by reference.

BACKGROUND OF THE INVENTION

1. Field of the Invention

The present general inventive concept relates to a digital cable broadcast processing apparatus and a method thereof, and more particularly, to a digital cable broadcast processing apparatus capable of controlling a power supply in accordance with absence and presence of a cable card, and a processing method thereof.

2. Description of the Related Art

A digital cable broadcast system mainly includes a head-end, a digital cable receiver such as an open cable apparatus, and a cable card. A digital cable signal transmitted from the head-end, is interoperable with the digital cable receiver and the cable card which is mounted in the digital cable receiver.

A digital cable signal transmitted from the head-end contains a cable broadcast program for transmission to in-band (InBand), and out-of-band (OOB) data for transmission to out-of-band (OOB). Therefore, a digital cable receiver has a path for processing a cable broadcast program, and a path for processing OOB data. The OOB data contains data for control between the head-end and the digital cable receiver, and additional data related with broadcast programs.

A cable broadcast program or OOB data, being transmitted to the digital cable receiver, is in a scrambled state. Accordingly, the cable broadcast program and OOB data can be provided to the cable card after demodulating. A cable card refers to a POD module (point of deployment module) which descrambles the cable broadcast program or OOB data, and is mounted in the digital cable receiver by a PCMCIA (personal computer memory card international association) interface.

A problem of the conventional digital cable receiver as described above is that power is continuously supplied to blocks such as a tuner and a QPSK modulator, which are associated with the transmission and reception of OOB data, even when the digital cable receiver is in stand-by mode and there is no cable card mounted. This is because of the fact that the digital cable receiver always receives the OOB data. Here, the 'stand-by mode' refers to a situation where the power is supplied to the digital cable receiver for the reception of OOB data while the viewer is not actually viewing the broadcast.

As described above, a conventional digital cable receiver consumes power even in the stand-by mode and when there is no cable card mounted. For example, the conventional digital cable receiver consumes approximately 15 W of power during the stand-by mode, while the general digital TV consumes up to 3 W of power during the stand-by mode.

SUMMARY OF THE INVENTION

The present general inventive concept has been developed in order to solve the above drawbacks and other problems associated with the conventional arrangement. Accordingly, the present general inventive concept provides a digital cable broadcast processing apparatus which can reduce unnecessary power consumption when there is no cable card mounted, and a processing method thereof.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a digital cable broadcast processing apparatus, comprising a power supply, an OOB receiver to receive additional information from a transmission system, an interface in which a cable card to descramble the received additional information is mounted, and a controller to control the power supply in accordance with the presence and absence of the cable card in the interface, and intermitting the power supply to the OOB receiver.

Additionally, an OOB demodulator is provided to demodulate the additional information received in the OOB receiver. The controller, when determining that the cable card is mounted in the interface, controls the power supply to supply the power to the OOB receiver and the OOB demodulator.

When determining that the cable card is not mounted in the interface, the controller controls the power supply to cut off the power to at least one of the OOB receiver and the OOB demodulator.

Additionally, an OOB transmitter is provided to transmit a response information in accordance with the request from the transmission system. The response information is generated at the cable card, and the controller, when determining that the cable card is not mounted in the interface, controls the power supply to cut off the power supply to the OOB transmitter.

Additionally, a DOCSIS (Data Over Cable Service Interface Specifications) modem is provided to transmit response information to the transmission system in accordance with the request from the transmission system. The response information is generated at the cable card, and the controller, when determining that the cable card is not mounted in the interface, controls the power supply to cut off the power supply to the DOCSIS modem.

The cable card and the interface supports a PCMCIA (Personal Computer Memory Card International Association) interface.

The foregoing and/or other features and advantages of the present general inventive concept are also achieved by providing a digital cable broadcast processing method which receives additional information from a transmission system, the method comprising determining whether a cable card to descramble the received additional Information is mounted or not, and controlling power supply to an out-of band (OOB) receiver based on the result of determination.

In the controlling operation, the power is supplied to an OOB receiver and an OOB demodulator when the cable card is mounted with the power supply, and the additional information is received from the transmission system and demodulated.

In the controlling operation, the power supply to at least one of the OOB receiver and the OOB demodulator is cut off when the cable card is not mounted.

In the controlling operation, the power supply to an OOB transmitter is cut off when the cable card is not mounted, and therefore the OOB transmitter does not transmit information.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
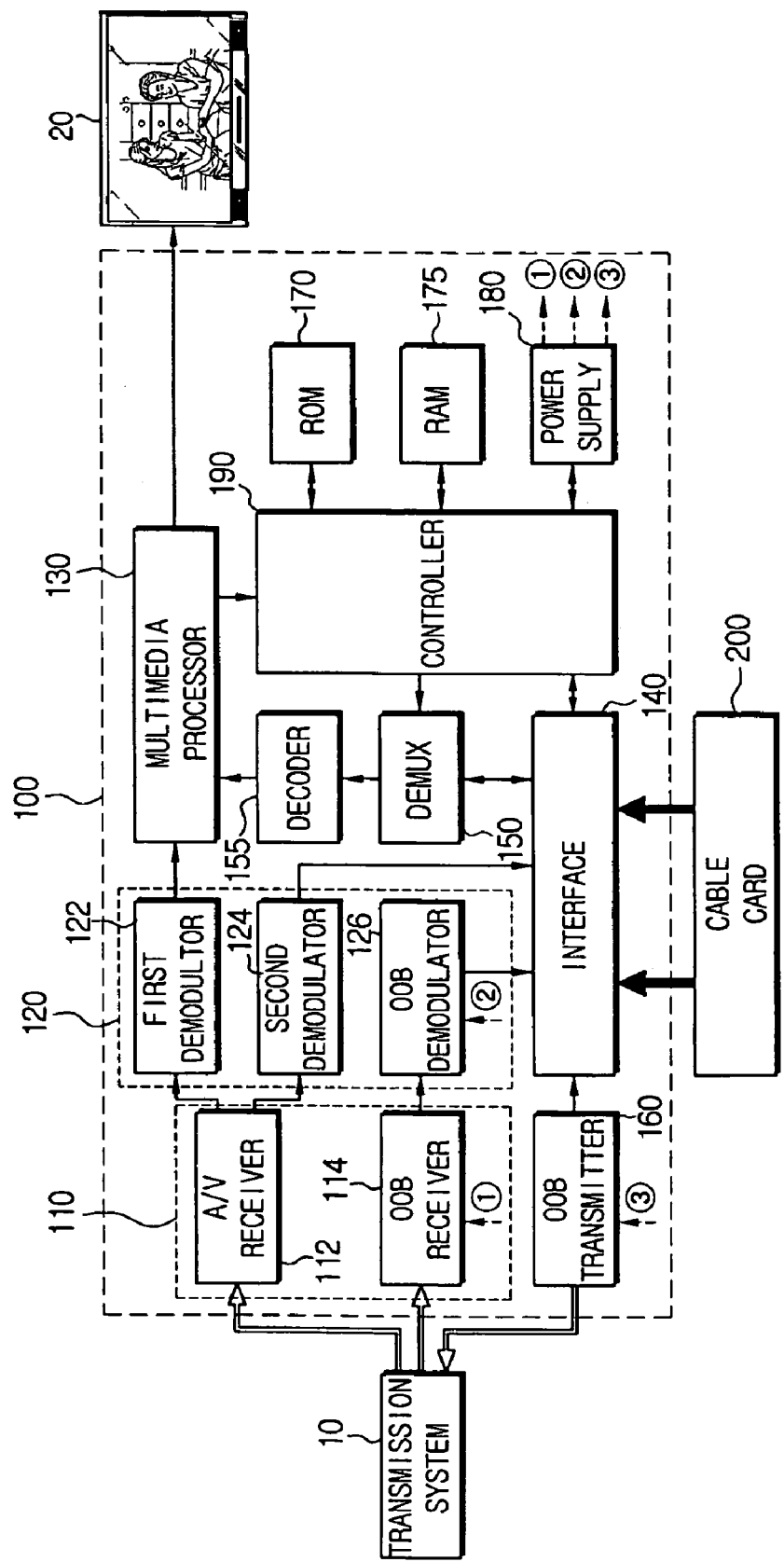
FIG. 1 is a block diagram of a digital cable processing apparatus according to an embodiment of the present general inventive concept.

Certain embodiments of the present general inventive concept will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the general inventive concept. Thus, it is apparent that the present general inventive concept can be carried out without those defined matters. Also, well-known functions or constructions are not described in detail since they would obscure the general inventive concept in unnecessary detail.

FIG. 1 is a block diagram showing a digital cable broadcast processing apparatus according to an embodiment of the present general inventive concept.

Referring to FIG. 1, a digital cable broadcast processing apparatus 100 (hereinbelow called a 'digital device') comprises a receiver 110, a demodulator 120, a multimedia processor 130, an interface 140, a demultiplexer (DeMux) 150, a decoder 155, an OOB transmitter 160, a ROM 170, a RAM 175, a power supply 180 and a controller 190.

The digital device 100 as shown in FIG. 1 provides open cable and POD functions, and includes as an example, a digital cable ready (DCR) TV, and a DCR set-top box.

A cable card 200, for example, may be mounted to provide a conditional access system (CAS) function. Other CAS function providers may be used as an alternative. If the cable card 200 is not mounted, the digital device 100 controls such that power is not supplied to at least one of an OOB receiver 114, an OOB demodulator 126, and an OOB transmitter 160 which will be described below.

If the cable card 200 is mounted, the digital device 100 controls such that power can be supplied to the OOB receiver 114 and the OOB demodulator 126. Therefore, whether or not to receive the additional data transmitted from the transmission system 10 is determined in accordance with the presence and absence of the cable card 200.

The thick arrows of FIG. 1 indicate the cable card 200 being mounted in the interface 140. The arrows with dotted lines indicate the path of power from the power supply 180 which is supplied or cut off in accordance with the control of the controller 190.

The transmission system 10 acts as a signal relay in the cable broadcasting. A head-end is one of representative examples of such a transmission system 10. The transmission system 10 transmits an audio/video (A/V) signal, and OOB data for general or cable broadcast programs.

The receiver 110 may include an A/V receiver 112 and an OOB receiver (OOB Rx) 114, as illustrated. One signal tuner can constitute the receiver 110, or separate tuners can be employed to act as the A/V receiver 112 and the OOB receiver 114 in the receiver 110.

The A/V receiver 112 tunes to a predetermined channel among a plurality of channels for an A/V signal transmitted from the transmission system 10. The OOB receiver 114 is an out-of-band tuner, and receives OOB data from the transmission system 10. The OOB data may comprise subtitle data, EPG data, and verification data.

The demodulator 120 may include a first demodulator 122, a second demodulator 124 and the OOB modulator 126.

The first demodulator 122 demodulates an A/V signal of the tuned channel if the tuned channel is a general broadcast program. If the A/V signal of the tuned channel has an NTSC (National Television System Committee) format, the first demodulator 122 outputs the A/V signal to the multimedia processor 130.

The second demodulator 124 can be a QAM (Quadrature Amplitude Modulation) demodulator, which demodulates the A/V signal of the tuned channel if the tuned channel is a cable broadcast program which is modulated in accordance with a QAM format. The second demodulator 124 outputs the demodulated A/V signal to the interface 140.

The OOB demodulator 126 demodulates the OOB data received at the OOB receiver 114. Most of the OOB data are modulated by a QPSK (Quadrature Phase Shift Keying) method, and therefore, a QPSK demodulator can be used as the OOB demodulator 126.

The multimedia processor 130 processes a signal from the first demodulator 122 or the decoder 155 (described below) and provides the processed signal to an external device 20. For example, the multimedia processor 130 signal-processes or graphic-processes the A/V signal from the first demodulator 122. When the OOB data from the decoder 155 is to be used for a subtitle, the multimedia processor 130 processes the signal so that the OOB data can be displayed as subtitles.

When a DCR set-top box is applied as the digital device 100 according to the present general inventive concept, the multimedia processor 130 outputs a processed signal to the external device 20 through an output terminal (not shown).

The output terminal (not shown) may include at least one among a RF output terminal, a base band video/audio signal output terminal(s), a S-video signal output terminal, and a digital audio signal output terminal.

The interface 140 may have a PCMCIA format, which has 68 lines or 68 pins. In accordance with the type of PCMCIA card being mounted in the interface 140, certain lines may vary the functions. Accordingly, all kinds of cards, such as a cable card and a LAN card that support the PCMCIA format, can be mounted in the interface unit 140. In the present embodiment, the cable card 200 is depicted as being mounted in the interface 140.

The cable card 200 descrambles the A/VN signal output from the second demodulator 124 or the OOB data which is outputted from the OOB demodulator 126. After descrambling, the A/V signal or the OOB data is input to the DeMux 150.

It is generally known that the interface 140 and the cable card 200 transmit and receive control signals, address signals, OOB data and data signals (DATA) using 68 lines.

The DeMux 150 demultiplexes incoming signals when the A/V signal or OOB data descrambled by the cable card 200 is inputted through the interface 140, into audio signals, video signals and OOB data.

The decoder 155 decodes the audio signals, video signal and OOB data from the DeMux 150 and outputs the decoded result to the multimedia processor 130.

The digital device 100 may perform bi-directional communication with the transmission system 10 using the OOB receiver 114, the cable card 200 and the OOB transmitter 160.

The OOB transmitter (OOB Tx) 160 transmits response data, which is generated at the cable card 200, in accordance with the request of the transmission system 10. To describe it in more detail, the cable card 200 receives a command from the transmission system 10 through the OOB receiver 114, interprets the received commands, performs as requested by the transmission system 10 in communication with the controller 190, and generates the response data. The generated response data is transmitted by the OOB transmitter 160 to the transmission system 10.

The cable card 200 generates response data in accordance with the request of the transmission system 10. The cable card 200 descrambles the signal if the received signal is in a scrambled state, and bypasses the signal to the DeMux 150 if the received signal is not in the scrambled state.

The ROM 170 is a non-volatile memory element, and stores therein a variety of control programs to realize functions of the digital device 100. The ROM 170 additionally stores therein identifying information to discern the type of the PCMCIA card being mounted in the interface 140.

The RAM 175 is a volatile memory element, which temporarily stores therein a program loaded for the execution by the controller 190, or the data generated during the processing of the controller 190.

The power supply 180 supplies power to each of the blocks mentioned above. To describe it in greater detail, the power supply 180 supplies power to the controller 190 and the interface 140 when the digital device 100 is in the stand-by mode. The 'stand-by mode' refers to an operation mode when the viewer does not view the broadcasting and a certain level of power is supplied to the digital device 100.

Additionally, the power supply 180 selectively supplies or cuts off the power to each of the blocks operating in association with the OOB data. This will be described in detail below with reference to the controller 190.

The controller 190 drives a variety of pre-stored programs so that the overall operation of the digital device 100 can be performed. In this embodiment, the controller 190 determines whether or not the cable card 200 is mounted in the interface 140, and controls the operation of the power supply 180 based on the determination.

More specifically, if it is determined that the cable card 200 is mounted in the interface 140, the controller 190 controls the power supply 180 to supply power to the OOB receiver 114, the OOB demodulator 126 and the OOB transmitter 160 (indicated by the arrows with dotted lines ①, ②, ③). As a result, the OOB receiver 114 receives the OOB data, and the OOB demodulator 126 demodulates the received OOB data.

When it is determined that there is no cable card 200 mounted in the interface 140, the controller 190 controls the power supply 180 to cut off the power to at least one of the OOB receiver 114, the OOB demodulator 126 and the OOB transmitter 160 (indicated by the arrows with dotted lines ①, ②, ③).

Therefore, in the absence of the cable card 200, the OOB data, being transmitted from the transmission system 10, is not received in the OOB receiver 114, and therefore, the power supply to the OOB receiver 114, the OOB demodulator 126 and the OOB transmitter 160 is reduced.

Figure 2:
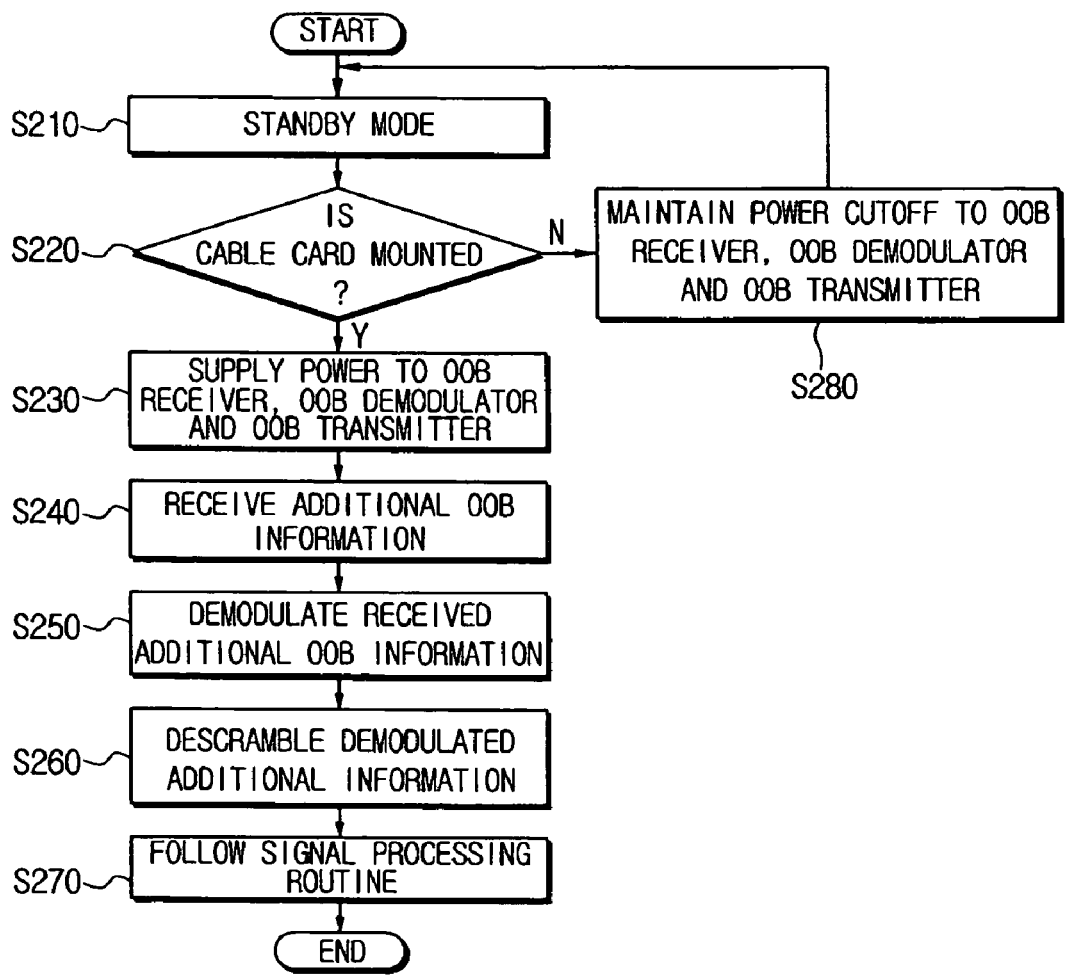
FIG. 2 is a flowchart illustrating a digital cable broadcast processing method used with the apparatus shown in FIG. 1.

FIG. 2 is a flowchart illustrating the digital cable broadcast processing method by the device shown in FIG. 1.

Referring to FIGS. 1 and 2, first, when the digital device 100 is in stand-by mode, power is supplied from the power supply 180 to the controller 190 and the interface 140.

Then, when the controller 190 determines that the cable card 200 is mounted in the interface 140, the controller 190 controls the power supply 180 to supply power to the all blocks related with the processing of OOB data (operations S220 and S230).

If the controller 190 receives a signal from the interface 140 indicating the mounting of the PCMCIA card in the interface 140, the controller 190 checks the identification information stored in the memory (not shown) of the mounted PCMCIA card. If the checked identification information conforms with one of the identification information stored in the ROM 170, the controller 190 determines that the mounted PCMCIA card is mappable with the conforming identification information. The controller 190 then resets the construction in hardware level, such as a 68th line to receive and process the OOB data.

In operation S230, the controller 190 controls the power supply 180 to supply power to the blocks associated with the OOB data processing, such as the OOB receiver 114, the OOB demodulator 126 and the OOB transmitter 160, as illustrated by the arrows with dotted lines ①, ②, ③.

After the operation S230, the OOB receiver 114 receives OOB data, and the OOB modulator 126 sends out the modulated OOB data to the interface 140 (operations S240 and S250).

When the modulated OOB data is inputted to the interface 140 in the operation S250, the controller 190 controls the cable card 200 to descramble the modulated OOB data (operation S260). When the modulated OOB data is descrambled in operation S260, the cable card 200 passes the modulated OOB data to the DeMux 150.

After the operation S260, the controller 190 controls such that the descrambled OOB data can be processed in accordance with the general signal processing routines (operation S270). For example, when the received OOB data is for subtitle, the controller 190 controls the DeMux 150, the decoder 155 and the multimedia processor 130 to demultiplex and decode the descrambled OOB data, and process the signal into displayable signals. The controller 190 then controls an output terminal (not shown) to output the processed OOB data to the external device 20.

When the received OOB data indicates a request for the transmitting system 10, the controller 190 controls the cable card 200 to generate a response data and output the same to the OOB transmitter 160.

When it is determined that the cable card 200 is not mounted in the interface 140 in operation S220, the controller 190 controls the power supply 180 to maintain the standby mode (operation S280). Accordingly, the power supply 180 is controlled not to supply the power to at least one of the OOB receiver 114, the OOB demodulator 126 and the OOB transmitter 160. When the cable card 200 is not mounted in the interface 140, the OOB receiver 114 does not receive the OOB data from the transmission system 10. Therefore, power supply is cut off to certain blocks, and overall power consumption can be reduced.

Although it was described above in one example where the digital device 100 is in standby mode, the digital apparatus 100 and method thereof should not be considered as limiting to the above-mentioned embodiment.

Accordingly, the digital device 100 can equally efficiently control the power supply 180 during the activation mode. The 'activation mode' refers to a certain operation mode in which the viewers watch a certain content of broadcast by using the digital device 100. The only difference is that the activation mode requires the A/V receiver 112 to receive the A/V signal, and the OOB receiver 114 to receive OOB data, respectively, and also separately requires the first demodulator 122, the second demodulator 124 and the OOB demodulator 126.

In other words, to receive the A/V signal and OOB data using one tuner, the present general inventive concept may be applicable only to the digital device 100 which is in standby mode.

Figure 3:
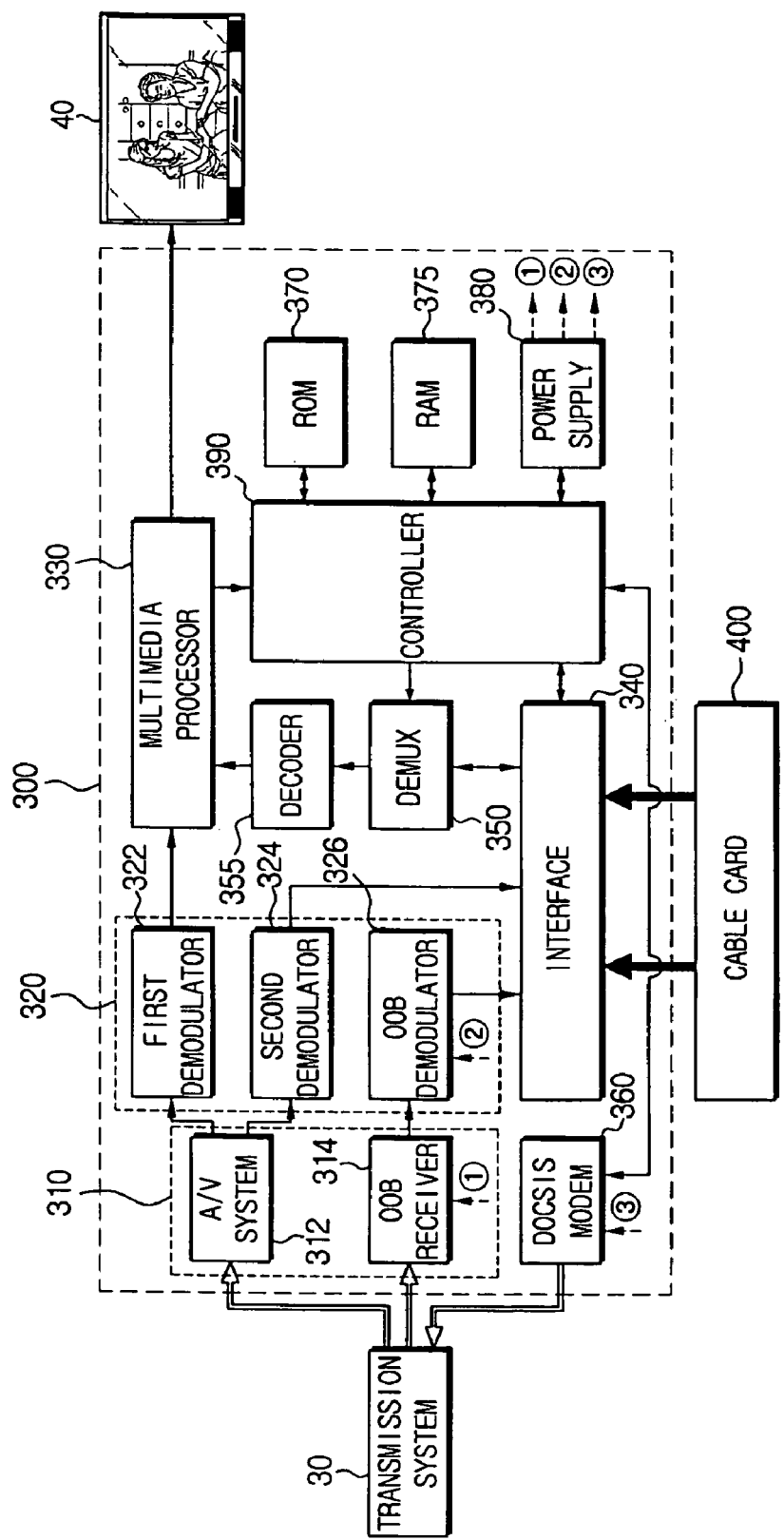
FIG. 3 is a block diagram of a digital cable broadcast processing apparatus according to another embodiment of the present general inventive concept.

FIG. 3 is a block diagram illustrating a digital device 300 according to another embodiment of the present invention.

Referring to FIG. 3, the digital device 300 comprises a signal receiver 310, a demodulator 320, a multimedia processor 330, an interface 340, a DeMUX 350, a decoder 355, a DOCSIS (Data Over Cable Service Interface Specifications) modem 360, a ROM 370, a RAM 375, a power supply 380 and a controller 390.

Referring first to FIG. 3, the signal receiver 310, the demodulator 320, the multimedia processor 330, the interface 340, the DeMUX 350, the decoder 355, the ROM 370, the RAM 375 and the cable card 400 operate in the same way as described above with reference to FIG. 1, and therefore, a detailed description will be omitted for the sake of brevity.

A unique feature of FIG. 3 is that the digital device 300 performs bi-directional communications with a transmission system 30 using the DOCSIS modem 360 instead of the OOB transmitter 160. When the cable card 400 is not mounted in the interface 340, the controller 390 controls the power supply 380 not to supply power to the DOCSIS modem 360.

When the cable card 400 is mounted in the interface 340, the controller 390 controls the power supply 380 to supply power to the OOB receiver 314, the OOB demodulator 326 and the DOCSIS modem 360. Upon receiving a predetermined request from the transmission system 30, the controller 390 controls the DOCSIS modem 360 to transmit a response data generated at the cable card 400 to the transmission system 30.

If the A/V receiver 112 and the OOB receiver 114 are incorporated into a single tuner, the digital device 300 can apply the present general inventive concept in the standby mode. If the A/V receiver 112 and the OOB receiver 114 are prepared as separate tuners as shown in FIG. 3, the digital device 300 can apply the present general inventive concept not only in the standby mode, but also in the activation mode.

With the digital cable broadcast processing apparatus and processing method thereof according to various embodiments of the present general inventive concept, power is not supplied to the OOB data-processing blocks when a cable card is not mounted. In the presence of the cable card, it is controlled in accordance with the present general inventive concept to supply power to each of the blocks to process the OOB data. As a result, unnecessary power consumption of the digital cable broadcast processing device in standby mode or activation mode is controlled.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A digital cable broadcast processing apparatus, comprising:
   a power supply;
   an OOB receiver to receive additional information from a transmission system;
   an interface in which a cable card to descramble the received additional information is removably mounted; and
   a controller to control the power supply in accordance with a presence or absence of the cable card mounted within the interface,
   the controller to selectively control the power supply to supply power to the OOB receiver, an OOB demodulator, and an OOB transmitter in accordance with the presence of the cable card mounted within the interface and an operation mode for a standby mode where broadcast information received by the digital broadcast processing apparatus is not viewed and a predetermined power is supplied to the digital broadcast processing apparatus,
   the controller to control the power supply to supply power to the OOB transmitter to transmit response information when the cable card is mounted within the interface, and
   the controller to selectively control the power supply to cut off the power to at least one of the OOB receiver, the OOB demodulator, and the OOB transmitter in accordance with the absence of the cable card mounted within the interface.

2. The apparatus of claim 1, further comprising the OOB demodulator to demodulate the additional information received by the OOB receiver, wherein the controller, when determining that the cable card is mounted in the interface, controls the power supply to supply the power to the OOB receiver and the OOB demodulator.

3. The apparatus of claim 2, wherein the controller, when determining that the cable card is not mounted in the interface, controls the power supply to cut off the power to at least one of the OOB receiver and the OOB demodulator.

4. The apparatus of claim 3, further comprising the OOB transmitter to transmit the response information in accordance with a request from the transmission system, the response information being generated at the cable card, wherein the controller, when determining that the cable card is not mounted within the interface, controls the power supply to cut off the power to the OOB transmitter.

5. The apparatus of claim 3, further comprising a DOCSIS (Data Over Cable Service Interface Specifications) modem to transmit the response information to the transmission system in accordance with a request from the transmission system, the response information being generated at the cable card, wherein the controller, when determining that the cable card is not mounted in the interface, controls the power supply to cut off the power to the DOCSIS modem.

6. The apparatus of claim 1, wherein the cable card and the interface communicates with a PCMCIA (Personal Computer Memory Card International Association) interface.

7. A digital cable broadcast processing method which receives additional information from a transmission system, comprising:
   determining whether a cable card to descramble the received additional information is mounted on a digital cable broadcast processing apparatus; and
   controlling the power supplied to the digital cable broadcast processing apparatus based on a result of the determination, the controlling including:
   controlling the power supplied to the OOB receiver, an OOB demodulator, and an OOB transmitter is selectively supplied to in accordance with presence of the cable card mounted in an interface and an operation mode for a standby mode where broadcast information received by the digital broadcast processing apparatus is not viewed and a predetermined power is supplied to the digital broadcast processing apparatus;

controlling the power supplied to the OOB transmitter to transmit response information when the cable card is mounted within the interface, and controlling the power supply to selectively cut off the power to at least one of the OOB receiver, the OOB demodulator, and the OOB transmitter in accordance with an absence of the cable card mounted within the interface.

8. The method of claim 7, wherein in the controlling operation, the power is supplied to an OOB receiver and an OOB demodulator when the cable card is mounted, and the additional information is received from the transmission system and demodulated.

9. The method of claim 8, wherein in the controlling operation, the power supply to at least one of the OOB receiver and the OOB demodulator is cut off when the cable card is not mounted.

10. The method of claim 9, wherein in the controlling operation, the power supply to the OOB transmitter is cut off when the cable card is not mounted, the OOB transmitter transmitting the response information generated at the cable card according to a request of the transmission system.

11. The method of claim 7, wherein the cable card communicates with a PCMCIA (Personal Computer Memory Card International Association) interface.

12. A digital cable broadcast processing apparatus that provides open cable and POD functions, comprising:
an OOB receiver to receive additional information from a transmission system;
an interface in which a conditional access system (CAS) providing unit to descramble the received additional information is removably mounted; and
a controller to control a power supply in accordance with a determination of a presence or absence of the CAS providing unit being mounted to the interface,
the controller to selectively control the power supply to supply power to the OOB receiver, an OOB demodulator, and an OOB transmitter in accordance with the presence of the CAS providing unit being mounted to the interface and an operation mode for a standby mode where broadcast information received by the digital broadcast processing apparatus is not viewed and a predetermined power is supplied to the digital broadcast processing apparatus,
the controller to control the power supply to supply power to the OOB transmitter to transmit response information when the CAS providing unit is mounted to the interface, and
the controller to selectively control the power supply to cut off the power to at least one of the OOB receiver, the OOB demodulator, and the OOB transmitter in accordance with the absence of the CAS providing unit being mounted to the interface.

13. The digital cable broadcast processing apparatus of claim 12, further comprising:
the OOB demodulator to demodulate the additional information received by the OOB receiver, wherein the controller controls the power supplied to the OOB receiver and the OOB demodulator when it is determined that the CAS providing unit is mounted to the interface.

14. The digital cable broadcast processing apparatus of claim 13, wherein when the controller determines that the CAS providing unit is not mounted to the interface, the controller controls the power supply to cut off power to at least one of the OOB receiver and the OOB demodulator.

15. The digital cable broadcast processing apparatus of claim 14, further comprising the OOB transmitter to transmit the response information generated at the CAS providing unit according to a request from the transmission unit, and the controller controls the power supply to cut off power to the OOB transmitter if it is determined that the CAS providing unit is not mounted.

16. The digital cable broadcast processing apparatus of claim 12, wherein the controller makes the determination of the presence or absence of the CAS providing unit by receiving a signal from the interface and checking identification information stored in the CAS providing unit if it is determined that the CAS providing unit is present.

17. The digital cable broadcast processing apparatus of claim 16, further comprising a ROM to store identifying information to determine a type of CAS providing unit being mounted to the interface, and the controller makes the determination by comparing the identification information stored in the CAS providing unit with the identifying information stored in the ROM.

18. A digital cable broadcast processing apparatus that provides open cable and POD functions, comprising:
an OOB processing system to receive and process additional information from a transmission system;
an interface in which a conditional access system (CAS) providing unit to descramble the received additional information is removably mounted; and
a controller to control a power supply in accordance with a determination of a presence or absence of the CAS providing unit being mounted to the interface,
the controller to selectively control the power supply to supply power to the OOB receiver, an OOB demodulator, and an OOB transmitter in accordance with the presence of the CAS providing unit being mounted to the interface and an operation mode for a standby mode where broadcast information received by the digital broadcast processing apparatus is not viewed and a predetermined power is supplied to the digital broadcast processing apparatus,
the controller to control the power supply to supply power to the OOB transmitter to transmit response information when the CAS providing unit is mounted to the interface, and
the controller to selectively control the power supply to cut off the power to at least one of the OOB receiver, the OOB demodulator, and the OOB transmitter in accordance with the absence of the CAS providing unit being mounted to the interface.

19. A digital cable broadcast processing method which receives additional information from a transmission system, comprising:
determining whether a CAS providing unit to descramble the received additional information is mounted on a digital cable broadcast processing apparatus; and
controlling power supplied to an out-of band (OOB) processing system Hof the digital cable broadcast processing apparatus based on the result of the determination, the controlling including:
controlling the power supplied to an OOB receiver, an OOB demodulator, and an OOB transmitter is selectively supplied to in accordance with presence of the CAS providing unit being mounted and an operation mode for a standby mode where broadcast information received by the digital cable broadcast processing apparatus is not viewed and a predetermined power is supplied to the controller of the digital cable broadcast processing apparatus;

controlling the power supplied to the OOB transmitter to transmit response information when the CAS providing unit is mounted, and controlling the power supply to selectively cut off the power to at least one of the OOB receiver, the OOB demodulator, and the OOB transmitter in accordance with the absence of the CAS providing unit being mounted in an interface.

20. The method of claim 19, wherein the controlling operation controls supplying power to the OOB receiver and the OOB demodulator such that the additional information is received and demodulated when it is determined that the CAS providing unit is mounted.

21. The method of claim 20, wherein the controlling operation controls the supply of power to be cut off from at least one of the OOB receiver and the OOB demodulator when it is determined that the CAS providing unit is not mounted.

22. A digital cable broadcast processing method of providing open cable and POD functions with a digital broadcast processing apparatus, the method comprising:

receiving and processing additional information from a transmission system with an out-of-band (OOB) processing system;

determining whether a removably mountable conditional access system (CAS) is mounted to an interface;

descrambling the received additional information with the conditional access system (CAS) when the CAS is mounted in the interface; and controlling a power supply in accordance with the determination of a presence or absence of the CAS being mounted to the interface, the controlling including:

controlling the power supply to an OOB receiver, an OOB demodulator, and an OOB transmitter is selectively supplied to in accordance with the presence of the CAS being mounted to the interface and an operation mode for a standby mode where broadcast information received by the digital broadcast processing apparatus is not viewed and a predetermined power is supplied to the digital broadcast processing apparatus;

controlling the power supplied to the OOB transmitter to transmit response information when the CAS is mounted to the interface, and controlling the power supply to selectively cut off the power to at least one of the OOB receiver, the OOB demodulator, and the OOB transmitter in accordance with the absence of the CAS being mounted in the interface.

* * * * *